(12) United States Patent
Storer et al.

(10) Patent No.: US 8,930,648 B1
(45) Date of Patent: Jan. 6, 2015

(54) DISTRIBUTED DEDUPLICATION USING GLOBAL CHUNK DATA STRUCTURE AND EPOCHS

(75) Inventors: Mark Walter Storer, Walnut Creek, CA (US); Timothy C. Bisson, Fremont, CA (US); Shankar Pasupathy, Milpitas, CA (US)

(73) Assignee: NetApp, Inc., Sunnyvale, CA (US)

( * ) Notice: Subject to any disclaimer, the term of this patent is extended or adjusted under 35 U.S.C. 154(b) by 260 days.

(21) Appl. No.: 13/479,138

(22) Filed: May 23, 2012

(51) Int. Cl.
*G06F 3/06* (2006.01)
*G06F 12/02* (2006.01)
*G06F 12/16* (2006.01)

(52) U.S. Cl.
CPC .......... *G06F 3/0641* (2013.01); *G06F 12/0246* (2013.01); *G06F 12/16* (2013.01); *G06F 12/0292* (2013.01); *G06F 3/067* (2013.01)
USPC .......................................... 711/154; 711/161

(58) Field of Classification Search
CPC ........... G06F 13/06; G06F 12/00; G06F 3/65; G06F 3/67; G06F 3/0641; G06F 11/0709; G06F 11/0727; G06F 12/02; G06F 12/0292
USPC ................................................. 711/154, 161
See application file for complete search history.

(56) References Cited

U.S. PATENT DOCUMENTS

| | | | |
|---|---|---|---|
| 8,706,833 B1* | 4/2014 | Bergant et al. | 709/214 |
| 2009/0222498 A1* | 9/2009 | Lu et al. | 707/204 |
| 2011/0145207 A1* | 6/2011 | Agrawal et al. | 707/692 |
| 2011/0219205 A1* | 9/2011 | Wright | 711/206 |
| 2011/0246733 A1* | 10/2011 | Usgaonkar et al. | 711/162 |
| 2011/0258404 A1* | 10/2011 | Arakawa et al. | 711/162 |
| 2011/0270800 A1* | 11/2011 | Chou et al. | 707/620 |
| 2012/0084523 A1* | 4/2012 | Littlefield et al. | 711/162 |
| 2012/0150826 A1* | 6/2012 | Vijayan Retnamma et al. | 707/692 |
| 2013/0318051 A1* | 11/2013 | Kumar et al. | 707/692 |

* cited by examiner

*Primary Examiner* — Hal Schnee
(74) *Attorney, Agent, or Firm* — Perkins Coie LLP

(57) ABSTRACT

Techniques for a data storage cluster and a method for deduplicating data in the data storage cluster in a scalable manner, by (among other things) using an epoch-based global chunk data structure, are disclosed herein. A global chunk data structure for an epoch is distributed and maintained at a plurality of metadata nodes within the data storage cluster. Fingerprints and identifiers of data chunks are written to the cluster after a particular epoch are written to delta chunk data structures stored in different metadata nodes of the cluster. When the data storage cluster advances to the next epoch, the global chunk data structure is updated using the delta chunk data structures. At any given time, data deduplication in the data storage cluster can be conducted based on the global chunk data structure for the current epoch.

28 Claims, 10 Drawing Sheets

DISTRIBUTED DEDUPLICATION USING GLOBAL CHUNK DATA STRUCTURE AND EPOCHS

FIELD OF THE INVENTION

At least one embodiment of the present invention pertains to data storage systems, and more particularly, to performing distributed deduplication in a data storage cluster.

BACKGROUND

Scalability is an important requirement in many data storage systems, particularly in network-oriented storage systems such as network attached storage (NAS) systems and storage area network (SAN) systems. Different types of storage systems provide diverse methods of seamless scalability through storage capacity expansion. In some data storage systems, it is possible to add capacity by "virtualization." In this type of system, multiple storage servers are utilized to field input/out (I/O) operations (i.e., reads and writes) independently, but are exposed to the initiator of the I/O operation as a single device, called a "storage cluster." Each storage server in a cluster is called a "storage node", a "data node" or just a "node." In a data storage cluster, the multiple data nodes can provide distributed storage of data. When available data storage capacity becomes low, a new server may be added as a new node in the data storage system. In addition to contributing increased storage capacity, the new storage node contributes other computing resources to the system, leading to true scalability. This methodology is known as "horizontal capacity expansion."

A process used in many storage systems that can affect scalability is data deduplication. Data deduplication is an important feature for data storage systems, particularly for distributed data storage systems. Data deduplication is a technique to improve data storage utilization by reducing data redundancy. A data deduplication process identifies duplicate data and replaces the duplicate data with references that point to data stored elsewhere in the data storage system. A deduplication technique that works well with a data storage system containing a large number of nodes and allowing adding new nodes is desirable. However, existing deduplication techniques for distributed storage systems suffer certain deficiencies as discussed below.

One technique for deduplicating data in a distributed storage system is inline deduplication. Inline deduplication deduplicates data before it is stored to long-term storage (e.g., disks), also called primary storage. This techniques works well for certain workloads such as backup streams, but tends to be far less effective when used with typical primary storage. Also, the node that performs inline deduplication tends to become a central bottleneck. Inline deduplication also normally requires a complete copy of a "chunk map" on each node that performs inline deduplication. A chunk map (also referred to as chunk data structure) in this context is a data structure that contains associations between identifier (IDs) of data chunks stored in the system and "fingerprints" of the data chunks. A "data chunk" is a contiguous portion of a data object. Fingerprints are unique values generated by a hashing algorithm, which can be used by a compare operation to detect possible duplicate data chunks quickly. A complete copy of the chunk map is needed on every node that does inline deduplication. The copies of chunk maps on separate nodes need to be synchronized frequently to avoid accidental data loss and inconsistent deduplication. Thus, for a system having a large number of nodes, the frequent needs of high volume synchronizations negates the potential benefits of having multiple copies of chunk maps on separate nodes. Therefore, it is difficult to scale in-line deduplication to a system or cluster containing a large number of nodes.

Content addressing is another technique used in some distributed storage systems to facilitate deduplication. Content addressing routes data blocks to specific nodes, based on the hashes of the contents in the data blocks. In a distributed system using content address, the storage load is often balanced across the nodes in the system; and each node is assigned to store data for a specific range of hashes (addresses). When a new node is added into the system, the storage load needs to be re-balanced. This re-balancing results in high volumes of network traffic. Further, nodes in the system can be overloaded from operations including negotiating which range of addresses each node stores, moving relevant data to the new locations, deleting data from its old location, and updating metadata. Therefore, this technique leads to considerable inter-node data transfer traffic and therefore poor scalability when new nodes are added to the distributed storage system.

SUMMARY

The technology introduced here includes a data storage cluster and a method for deduplicating data in the data storage cluster in a scalable manner, by using (among other things) an epoch-based, distributed global chunk data structure. An "epoch" in this context is a consistent view of a storage system at a point in time. The epoch-based, distributed global chunk data structure allows the data storage cluster to repeatedly deduplicate data in an efficient manner. The technique scales well to an arbitrary number of nodes in a cluster and enables adding new nodes to a cluster without substantially increasing data transfer.

In accordance with the techniques introduced here, a global chunk data structure for a particular epoch is distributed among and maintained at two or more of a plurality of metadata nodes within the data storage cluster. Fingerprints and identifiers of data chunks written to the cluster after a particular epoch are written to "delta chunk data structures" stored in different metadata nodes of the cluster in a log format, to record the differences between global chunk data structures of different epochs. When the data storage cluster advances to the next epoch, the global chunk data structure is updated using the delta chunk data structures. At any given time, data deduplication in the data storage cluster can be conducted based on the global chunk data structure for the current epoch. The delta chunk data structures based on epochs can also be used as a recovery mechanism in the event of node failure or storage device failure. Further, data nodes within the data storage cluster can use unused storage space to cache deduplicated data chunks, for fast access of the deduplicated data without retrieving data from other data nodes.

The technology introduced here further includes a method for deduplicating data in a data storage cluster. In one embodiment the method comprises: storing a global chunk data structure for a data storage cluster in a distributed manner among a plurality of metadata nodes of the data storage cluster, the global chunk data structure containing data fingerprints; recording fingerprints of new data written to the data storage cluster into a plurality of delta chunk data structures, wherein each of the delta chunk data structures is stored in a different one of the plurality of metadata nodes; updating a version of the global chunk data structure corresponding to a particular epoch to a consistent state based on versions of the delta chunk data structures corresponding to the particular epoch; and using the updated global chunk data structure to identify duplicate data in the data storage cluster.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not necessarily all refer to the same embodiment.

Figure 1:
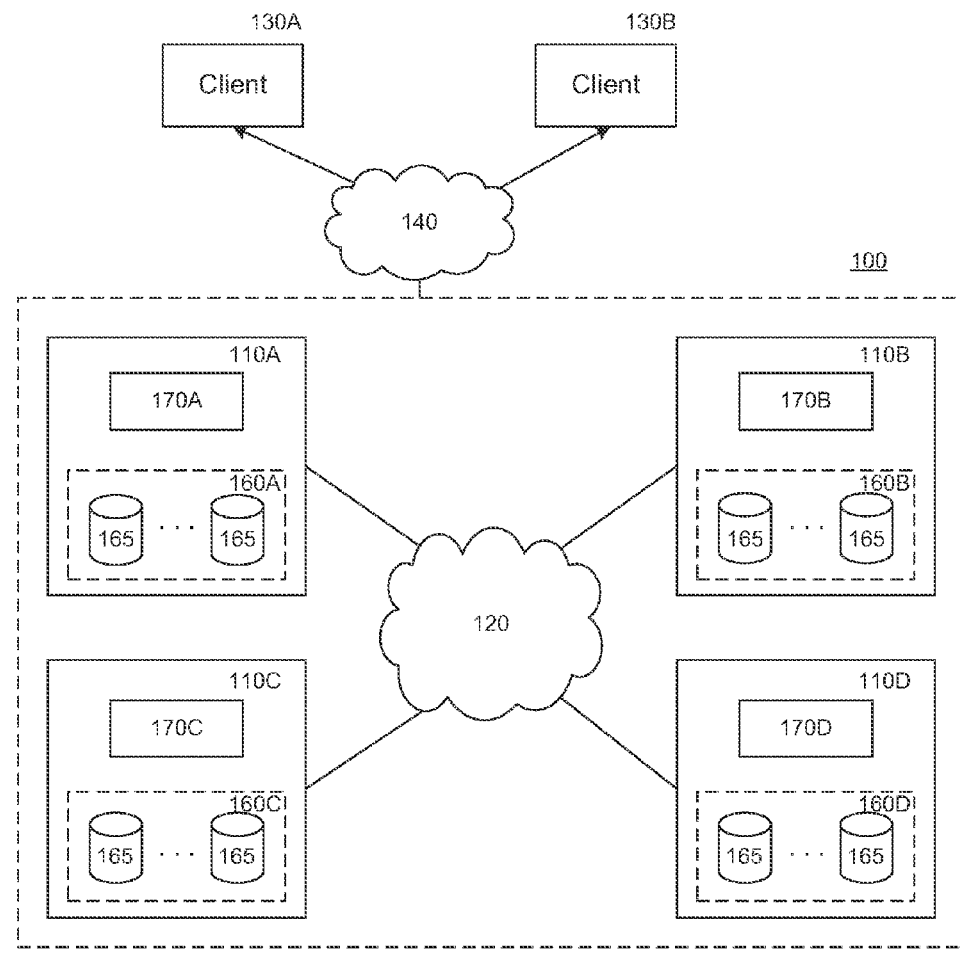
FIG. 1 illustrates an example of a data storage cluster including data nodes and metadata nodes.

FIG. 1 shows a data storage cluster in which the technique being introduced here can be implemented. In FIG. 1, the data storage cluster 100 includes a plurality of data nodes (110A, 110B) and metadata nodes (110C, 110D). The data nodes 110A, 110B provide distributed storage of data chunks. The nodes can communicate with each other through an interconnect 120. The interconnect 120 may be, for example, a local area network (LAN), wide area network (WAN), metropolitan area network (MAN), global area network such as the Internet, a Fibre Channel fabric, or any combination of such interconnects. Clients 130A and 130B may communicate with the data storage cluster 100 by contacting one of the nodes via a network 140, which can be, for example, the Internet, a LAN, or any other type of network or combination of networks. Each of the clients may be, for example, a conventional personal computer (PC), server-class computer, workstation, handheld computing/communication device, or the like.

Each node 110A, 110B, 110C or 110D receives and responds to various read and write requests from clients such as 130A or 130B, directed to data stored in or to be stored in persistent storage 160. Each of the nodes 110A, 110B, 110C and 110D contains a persistent storage 160 which includes a number of nonvolatile mass storage devices 165. The nonvolatile mass storage devices 165 can be, for example, conventional magnetic or optical disks or tape drives; alternatively, they can be non-volatile solid-state memory, such as flash memory, or any combination of such devices. In some embodiments, the mass storage devices 165 in each node can be organized as a Redundant Array of Inexpensive Disks (RAID), in which the node 110A, 110B, 110C or 110D accesses the persistent storage 160 using a conventional RAID algorithm for redundancy.

Each of the nodes 110A, 110B, 110C or 110D may contain a storage operating system 170 that manages operations of the persistent storage 160. In certain embodiments, the storage operating systems 170 are implemented in the form of software. In other embodiments, however, any one or more of these storage operating systems may be implemented in pure hardware, e.g., specially-designed dedicated circuitry or partially in software and partially as dedicated circuitry.

Each of the data nodes 110A and 110B may be, for example, a storage server which provides file-level data access services to hosts, such as commonly done in a NAS environment, or block-level data access services such as commonly done in a SAN environment, or it may be capable of providing both file-level and block-level data access services to hosts. Further, although the nodes 110A, 110B, 110C and 110D are illustrated as single units in FIG. 1, each node can have a distributed architecture. For example, a node can be designed as a combination of a network module (e.g., "N-blade") and disk module (e.g., "D-blade") (not shown), which may be physically separate from each other and which may communicate with each other over a physical interconnect. Such an architecture allows convenient scaling, such as by deploying two or more N-modules and D-modules, all capable of communicating with each other through the interconnect. Further, each node can be a virtualized node. For example, each node can be a virtual machine or a service running on physical hardware.

Figure 2:
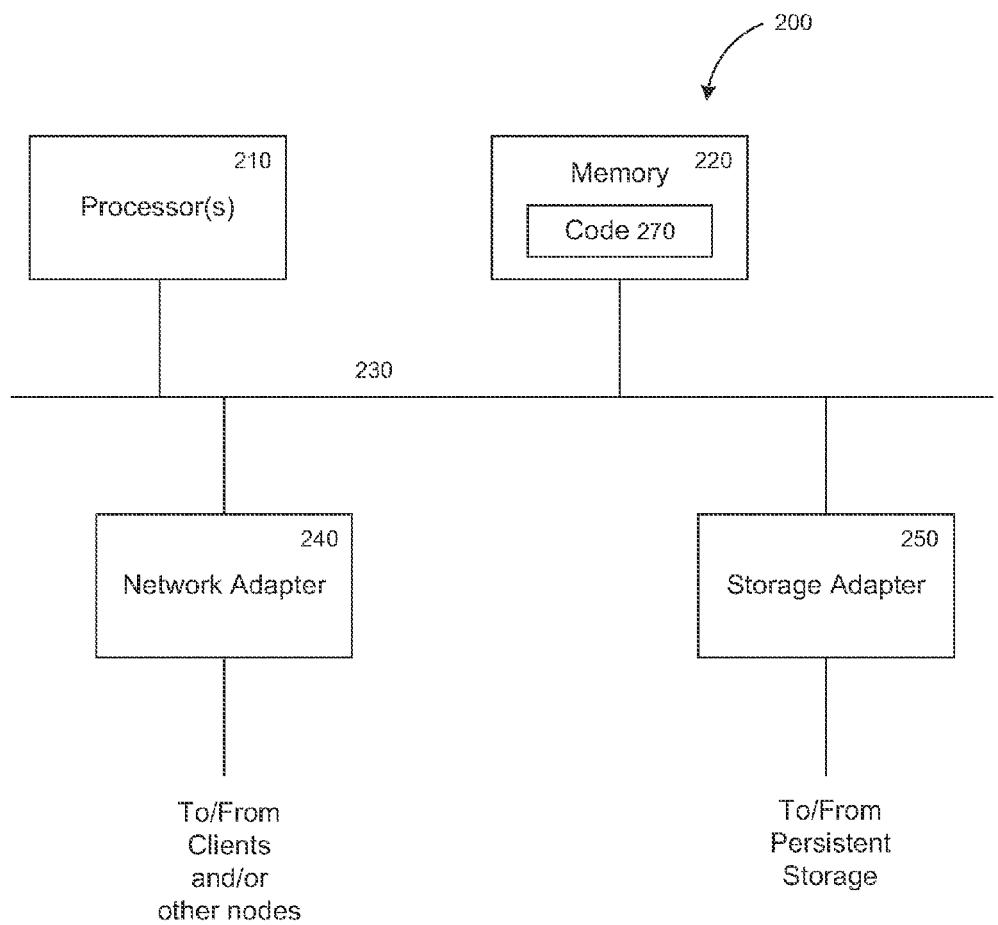
FIG. 2 is a high-level block diagram showing an example of the architecture of a node of the data storage cluster.

FIG. 2 is a high-level block diagram showing an example of the architecture of a node 200, which may represent any of data nodes 110A, 110B or metadata node 110C, 110D. The node 200 includes one or more processors 210 and memory 220 coupled to an interconnect 230. The interconnect 230 shown in FIG. 2 is an abstraction that represents any one or more separate physical buses, point to point connections, or both connected by appropriate bridges, adapters, or controllers. The interconnect 230, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 210 is/are the central processing unit (CPU) of the storage controller 200 and, thus, control the overall operation of the node 200. In certain embodiments, the processor(s) 210 accomplish this by executing software or firmware stored in memory 220. The processor(s) 210 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 220 is or includes the main memory of the node 200. The memory 220 represents any form of random access memory (RAM), read-only memory (ROM), flash memory, or the like, or a combination of such devices. In use, the memory 220 may contain, among other things, code 270 embodying at least a portion of a storage operating system of the node 200. Code 270 may also include a deduplication application.

Also connected to the processor(s) 210 through the interconnect 230 are a network adapter 240 and a storage adapter 250. The network adapter 240 provides the node 200 with the ability to communicate with remote devices, such as clients 130A or 130B, over a network and may be, for example, an Ethernet adapter or Fibre Channel adapter. The network adapter 240 may also provide the node 200 with the ability to communicate with other nodes within the data storage cluster. In some embodiments, a node may use more than one network adapter to deal with the communications within and outside of the data storage cluster separately. The storage adapter 250 allows the node 200 to access a persistent storage, such as persistent storage 160, and may be, for example, a Fibre Channel adapter or SCSI adapter.

The code 270 stored in memory 220 may be implemented as software and/or firmware to program the processor(s) 210 to carry out actions described below. In certain embodiments, such software or firmware may be initially provided to the node 200 by downloading it from a remote system through the node 200 (e.g., via network adapter 240).

The distributed storage system, also referred to as a data storage cluster, can include a large number of distributed data nodes. For example, the distributed storage system may contain more than 1000 data nodes, although the technique introduced here is also applicable to a cluster with a very small number of nodes. Data is stored across the nodes of the system. The deduplication technique disclosed herein applies to the distributed storage system by gathering deduplication fingerprints from distributed storage nodes periodically, processing the fingerprints to identify duplicate data, and updating a global chunk data structure consistently from a current epoch to the next epoch.

Figure 3:
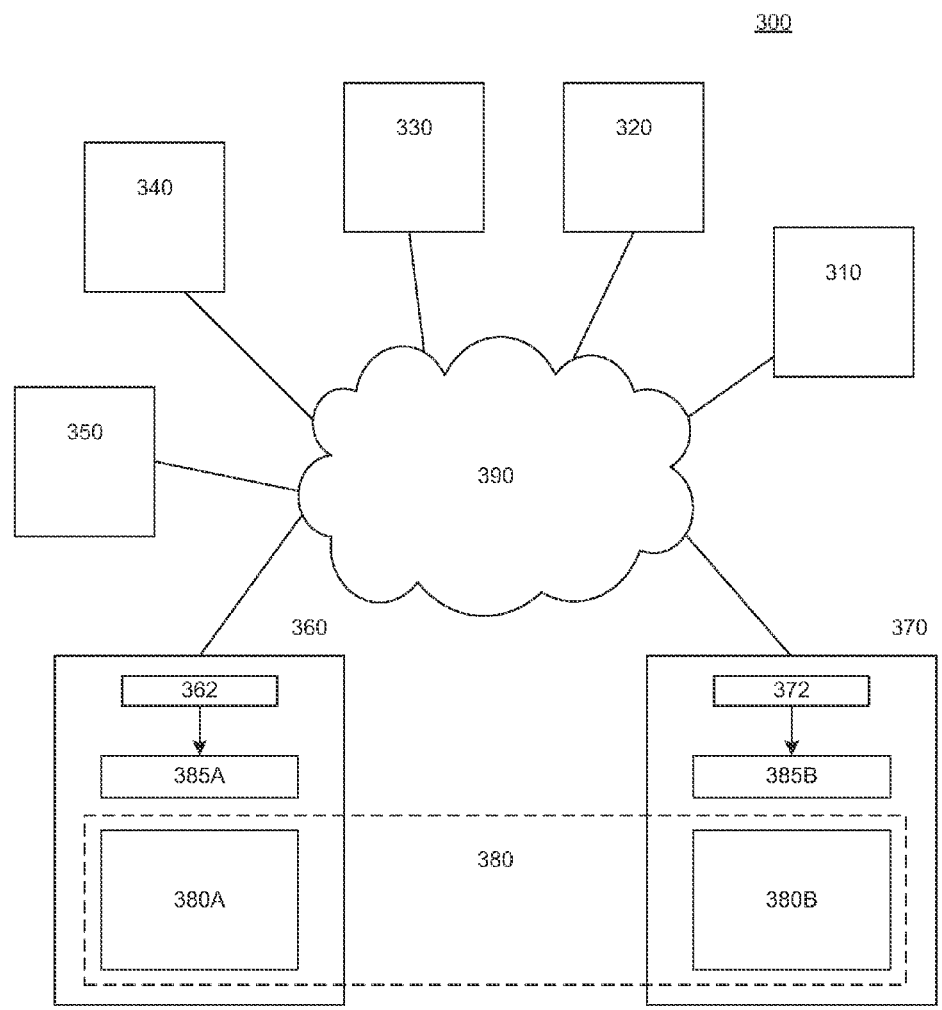
FIG. 3 illustrates an example of a data storage cluster including data nodes and metadata nodes that maintain a global chunk data structure.

In one embodiment, as shown in FIG. 3, distributed storage system 300 (also referred to as data storage cluster 300) includes data nodes 310, 320, 330, 340, 350 and metadata nodes 360, 370. Similar to data node 110A, 110B and metadata nodes 110C, 110D shown in FIG. 1, nodes 310-370 are interconnected by an interconnect 390. The interconnect 390 may be, for example, a local area network (LAN), wide area network (WAN), metropolitan area network (MAN), global area network such as the Internet, a Fibre Channel fabric, or any combination of such interconnects. The system 300 does not require that each of the metadata nodes 360, 370 maintain an entire copy of a centralized chunk data structure. Instead, each of the metadata nodes 360, 370 is responsible for maintaining only a portion of a global chunk data structure 380. The global chunk data structure associates the fingerprints of data chunks to the locations on data nodes for the data chunks. A data chunk (also called simply "chunk") can contain one or more data blocks, where a "data block" is the smallest unit by which the storage system reads and writes user data. A fingerprint is a piece of metadata, typically a hash, calculated from contents of a data chunk. The location of a chunk can be represented by a unique chunk identifier (ID). In some other embodiments, a distributed storage system may include one metadata node and the entire copy of a global chunk data structure is maintained on the metadata node.

As shown in FIG. 3, metadata node 360 maintains a portion 380A of the global chunk data structure 380. Assume that metadata node 360 is responsible for storing fingerprints of data stored in data nodes 310, 320 and 330 in portion 380A of global chunk data structure 380. Accordingly the metadata node 360 is referred to as "assigned to" data nodes 310, 320 and 330. Similarly, assume that metadata node 370 is responsible for storing fingerprints of data stored in data nodes 340 and 350 in portion 380B of global chunk data structure 380. In another words, the metadata node 370 is "assigned to" data nodes 340 and 350. A combination of portions 380A and 380B forms an entire copy of the global chunk data structure 380. In some embodiments, chunks on the data nodes are "assigned to" metadata nodes by chunk IDs. For example, metadata node 360 can store fingerprints of chunks that have chunk IDs less than a predetermined ID; metadata node 370 can store fingerprints of chunks that have chunk IDs equal to or larger than the predetermined ID. In some other embodiments, metadata nodes are not assigned to any data nodes; instead, the decision to which metadata node a data node sends fingerprints is determined dynamically based on any of various factors, such as workloads of the metadata nodes at that point in time.

From time to time (e.g., periodically or in response to a defined trigger event), the data nodes 310-350 compute fingerprints of the chunks of new data that they have recently stored or deleted and send those fingerprints to their assigned metadata nodes 360, 370. Fingerprints may be computed according to any known or convenient hashing algorithm, such as SHA-256 for example. Fingerprints recorded in the various portions of the global chunk data structure 380 can be used to identify duplicate data duplication. If two data chunks have identical fingerprints, the data chunks probably are identical. A byte-by-byte comparison of the chunks can be further performed to determine if the chunks actually are identical. In addition to the fingerprints, the nodes may send additional information to the metadata nodes 360, 370, indicating whether the data chunks corresponding to the sent fingerprints were added to the data node or deleted. In one embodiment, the metadata nodes 360, 370 store the fingerprints in their respective staging areas 362, 372 until the fingerprints used for deduplication and written to delta chunk data structures 385A, 385B.

Each of the metadata nodes 360, 370 implements a log, henceforth called a delta chunk data structure (385A, 385B), which contains a list of fingerprints from the data nodes, and information about whether these fingerprints correspond to chunks that are being added or deleted. The delta chunk data structures 385A, 385B further contain chunk IDs associated to the chunk that is being added or deleted, as well as node IDs (or other forms of node identification) of the nodes on which the chunks are stored. Therefore, the delta chunk data structures 385A, 385B are used to update the global chunk data structure for the next epoch.

At any given time, a current version of the global chunk data structure 380 is used for deduplication during the current epoch and delta chunk data structures 385A, 3805B are maintained to record changes between the versions of the global chunk data structure 380 for the current epoch and the next epoch. For example, assuming the current epoch is X, as time passes, data chunks are added to delta chunk data structures 385A, 3805B of epoch X. At some subsequent point in time, the data storage cluster 300 starts to update the global chunk data structure 380 of epoch X. When all entries in the delta chunk data structures 385A, 3805B for epoch X are processed to update the global chunk data structure 380 for epoch X, the data storage cluster 300 advances the epoch of the global chunk data structure 380 to X+1, and creates new versions of empty delta chunk data structures 385A, 3805B for epoch X+1. Between epoch X and epoch X+1, any node trying to identify duplicate chunks in the system uses the global chunk data structure 380 of epoch X, which is consistent. To identify duplicate chunks, fingerprints of added chunks are compared with entries in the global chunk data structure in the metadata nodes. Any chunk whose fingerprint matches any entry in the global chunk data structure is identified as likely duplicate chunk The chunk changes that have been processed from delta chunk data structures 385A, 3805B of epoch X are not utilized for deduplication until the next epoch X+1.

Use of the notion of an "epoch" allows for discrete states to be provided for the global chunk data structure 380. The epoch thereby enables a consistent global chunk data structure 380 to be maintained among the metadata nodes 360, 370. The delta chunk data structures 385A, 385B provide a mechanism for the cluster 300 to move from any arbitrary state to any other arbitrary state. The delta chunk data structures 385A, 385B, which record changes to the data chunks in a log format, may be utilized in node operations such as "apply" and "undo". Suppose, for example, that a node of the system 300 has been off-line and has now been brought back online. The node can poll the other nodes in the systems to determine the current epoch. By determining the epoch of its local replica of the global chunk data structure 380, and the current epoch of the system 300, the node identifies the delta chunk data structures that the node needs, and the order in which to apply them in order to move to an epoch consistent with rest of the system. The operations may be presented as Hoare triples. For example, the node may apply delta chunk data structures to move forward to a next epoch:

{Epoch i} apply(DeltaChunkDataStructure i) {Epoch i+1}.

Or the node may undo delta chunk data structures to roll back to a previous epoch:

{Epoch i} undo(DeltaChunkDataStructure i−1) {Epoch i−1}.

Figure 4:
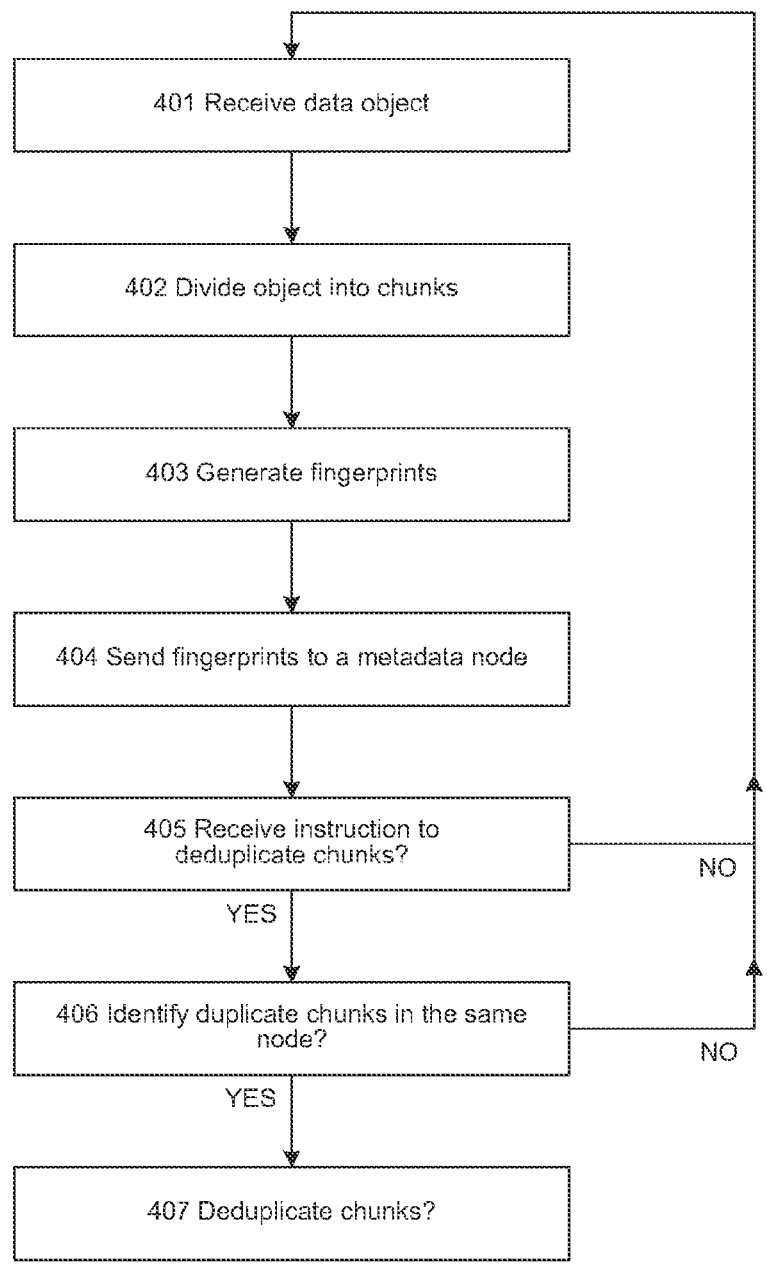
FIG. 4 illustrates an example of a process for a data storage cluster receiving a data request and generating fingerprints of the data.

FIGS. 4-8 illustrate examples for aspects of utilizing an epoch-based, distributed global chunk data structure in a data storage cluster. FIG. 4 illustrates an example of a process for a data storage cluster receiving a data request and generating fingerprints of the data. In this example, the data storage cluster includes a group of data nodes, such as data nodes 310-350 shown in FIG. 3, and a group of metadata nodes that maintain a global chunk data structure, such as metadata nodes 360 and 370 shown in FIG. 3. The global chunk data structure is distributed among two or more of the metadata nodes within the data storage cluster. Each of the metadata nodes maintains a portion of the global chunk data structure. A client sends to the data storage cluster a write request including a data object to be stored in the cluster (401). A data node in the cluster (for example, the node which received the request, though not necessarily) may divide the data from the request into data chunks (e.g., assuming the data object is large enough to warrant dividing it up) (402). That data node then generates the chunk fingerprints for the data chunks of the data object (403) and submits the chunk fingerprints to one of the metadata nodes (404). The data node sends the fingerprints to a metadata node that is assigned to that data node. In some other embodiments, after inquiring with the metadata nodes regarding their current workloads, the data node sends the fingerprints to the metadata node that has the least current workload. The metadata node stores those chunk fingerprints in its staging area until it is ready to perform deduplication.

Optionally, the metadata node can first compare the received fingerprints with the portion of the global chunk data structure stored in the metadata node to check whether the new data has chunks identical to chunks previously stored in the data node. In that case, if any matching fingerprints are identified, the metadata node sends instructions to the data node to deduplicate those chunks with matched fingerprints. If the data node receives any instructions from the metadata node to deduplicate chunks (405), the data node compares the possible duplicate chunks with chunks previously stored in the data node byte-by-byte. In some other embodiments, where chunks are determined as identical if their fingerprints are identical, no byte-by-byte comparison is performed. If no deduplication instruction is received from the metadata node, the data node waits to receive another data object (401). If any chunks of new data are determined to be identical to any chunks previously stored in the data node (406), the data node deduplicates accordingly by placing identifiers of chunks that already reside in the same node in an object record of the object as references of the duplicated chunks (407). If no chunks of the new data are determined to be identical to previously stored chunks, the data node waits to receive another data object (401). An object record is a data structure that contains metadata about a particular data object, including the chunks that form the object and the data nodes on which those chunks reside.

After receiving the fingerprints, when a metadata node determines that it is time to destage the staging area by moving the chunk fingerprints to long-term non-volatile storage, due to any of various possible triggers (such as elapsed time since last destaging or number of chunk fingerprints staged), the metadata node requests permission to lead the metadata nodes which maintain delta chunk data structures in a metadata epoch transition (increment operation). After the leading metadata node performed the metadata epoch transition process, other metadata nodes continue the process in an order. Part of the purpose of selecting a leading node for this process is to ensure that the selected metadata node is using the latest epoch's chunk data structure. In one embodiment, the permission is granted (or not) on the basis of an agreement among the metadata nodes. For example, a metadata node can be permitted to lead in the metadata epoch transition by all metadata nodes, because that node has the least workload and maintains a portion of global chunk data structure for the current epoch. In certain embodiments, an order of the metadata epoch transition process can be determined by a way of round robin, diffused computation, or leadership election. The metadata epoch transition process involves updating portions of the global chunk data structure maintained at metadata nodes within the data storage cluster.

Figure 5:
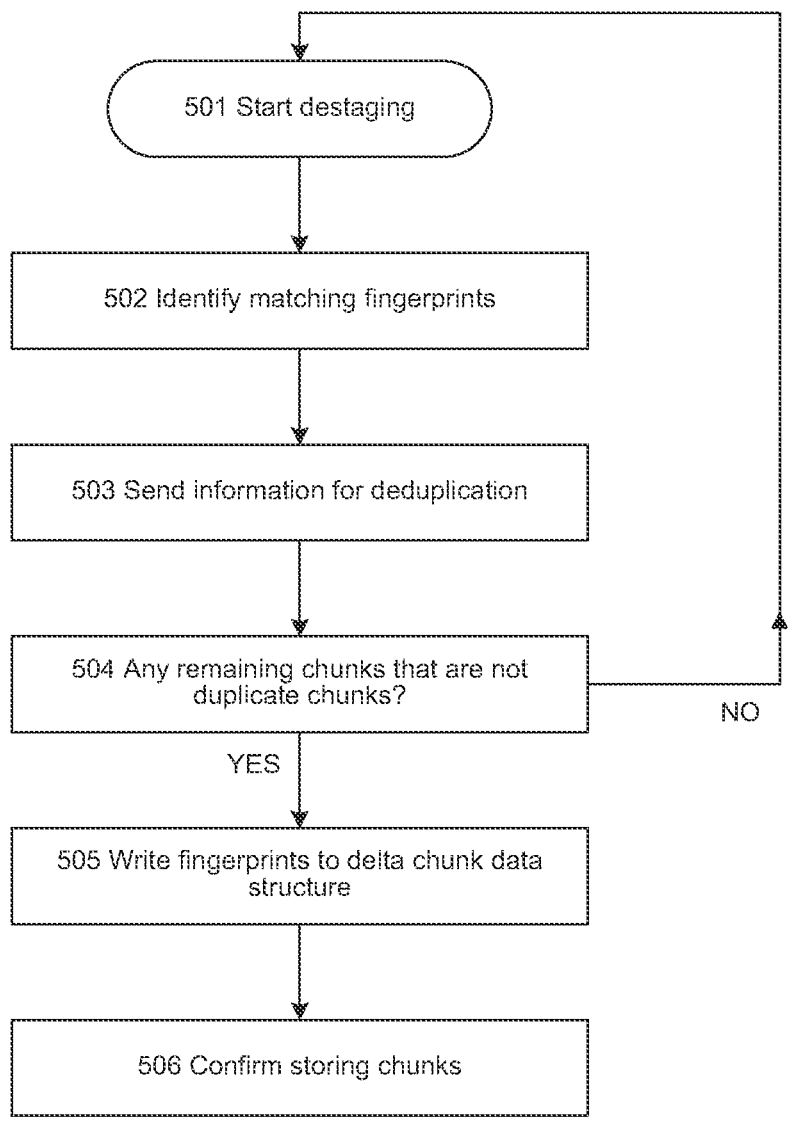
FIG. 5 illustrates an example of a destaging process including identifying duplicate data and updating delta chunk data structure.

If the metadata node receives permission to lead the metadata nodes which maintain delta chunk data structures in a metadata epoch transition, it becomes the metadata leader, and starts destaging (501) as shown in FIG. 5. The destaging process includes deduplicating chunks that are identified as duplicate chunks by the global chunk data structure, and moving the rest of the chunks (non-duplicates) into a delta chunk data structure that will be utilized later to update the global chunk data structure for the next epoch. At 502, the metadata node compares the fingerprints in the staging area with the entries in the global chunk data structure, and identifies the chunks whose fingerprints match any entries in the global chunk data structure as possible duplicate chunks. Further byte-by-byte comparison in data nodes can be conducted to confirm that the chunks are duplicated (the same). The metadata node reports these identified duplicate chunks to data nodes which need the information to deduplicate these chunks (503).

Deduplication does not necessarily change the state of the global chunk data structure. The data nodes deduplicate data chunks based on the information sent by the metadata node. In certain embodiment, the data nodes further cache data chunks that are deduplicated in unused storage space of their respective non-volatile storage devices. If there are data chunks that not identified as duplicate data chunks (504), the fingerprints of those data chunks are written by the metadata node into the delta chunk data structure (505). Otherwise, return to start destaging (501). Each delta chunk data structure in the cluster is stored in a different one of the metadata nodes. In some embodiments, the metadata node can further contact data nodes to confirm the storing of the data chunks not identified as duplicate data chunks (506). In some embodiments, the delta chunk data structure contains actual copies of data chunks, instead of fingerprints of data chunks.

Figure 6:
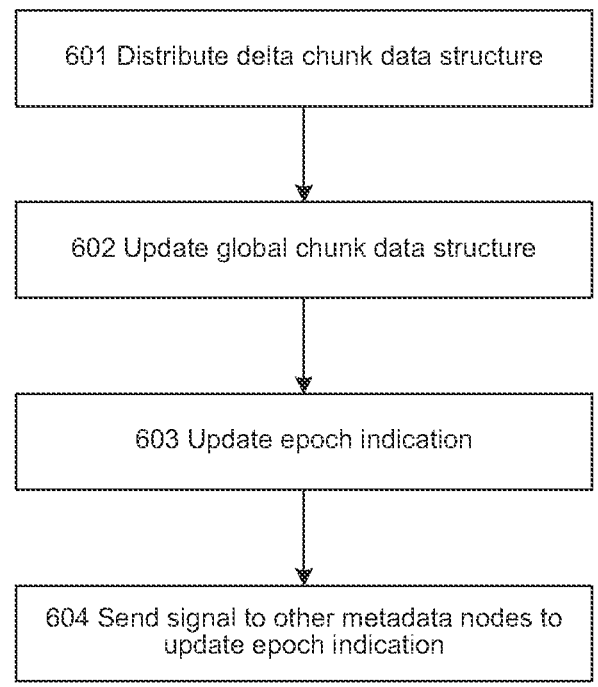
FIG. 6 illustrates an example of a process for updating a global chunk data structure for the next epoch.

The resulting delta chunk data structure (generated at 505) is useful both as an "undo" log in case there is a problem while incorporating new data chunks, and as the list of changes that mark the differences between two epochs. FIG. 6 illustrates an example of a process for updating the global chunk data structure for the next epoch. As shown in FIG. 6, when the data storage cluster moves to the next epoch, each metadata node sends its delta chunk data structure stored in the node to all other metadata nodes so that all metadata nodes can proceed to the next epoch by applying the delta chunk data structure to update their respective portions of the global chunk data structures (601). The global chunk data structure is updated by incorporating contents of the delta chunk data structures at times based on the epoch indication (602). After all delta chunk data structures on the metadata nodes are incorporated into the global chunk data structure, the metadata node updates an epoch indication for its portion of the global chunk data structure to a new value (603). The epoch indication indicates a version of the global chunk data structure. The metadata nodes whose portions of the global chunk data structure are updated in step 602 further sends signals to the other metadata nodes whose portions of the global chunk data structure are not changed in step 602 to increment the epoch indications of their respective portions of the global chunk data structure to the new value (604). Accordingly, an epoch indication at each of the other metadata nodes is updated with the new value.

Figure 7:
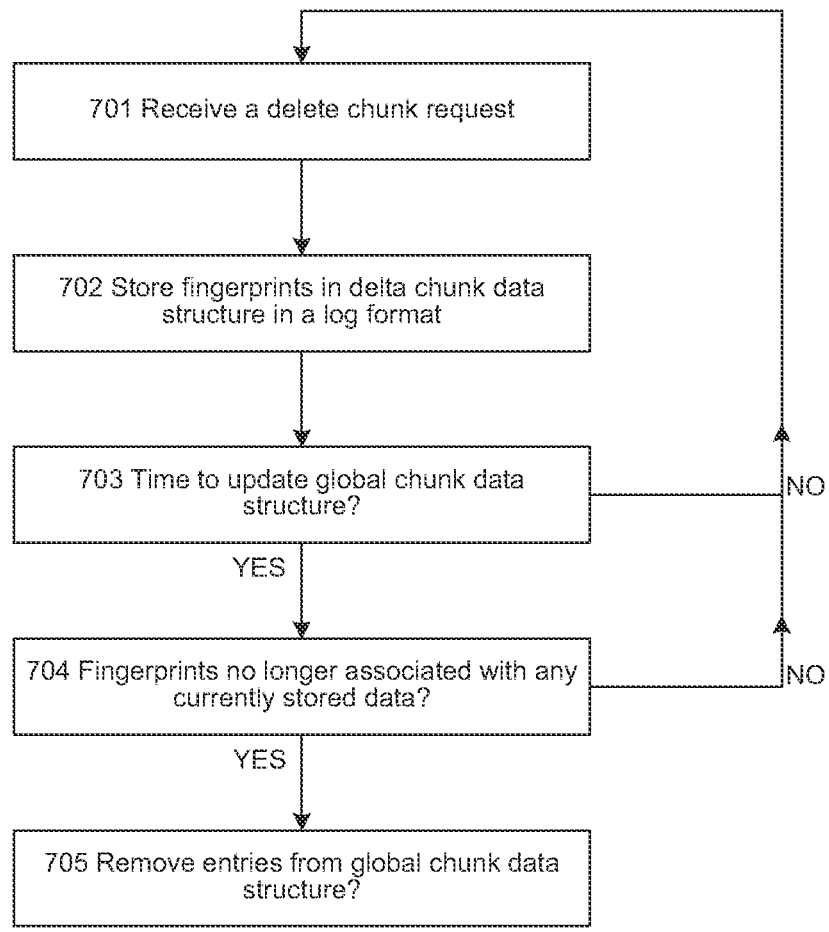
FIG. 7 illustrates an example of a process for handling a request for deleting a data chunk.

A chunk request can include an operation flag which indicates to add or delete the data chunk. At some point a data node within the data storage cluster may receive a request to delete a data chunk (with a delete operation flag), as illustrated in FIG. 7. In that event, the fingerprints and identifier of the data chunk will be written to a delta chunk data structure in a log format stored in its assigned metadata node (702). When the delta chunk data structure is used to update the global chunk data structure (703), the fingerprint and identifier will be removed from the global chunk data structure (705). Similarly, if the global chunk data structure shows that the fingerprint for the deleted data chunk is no longer associated with any data chunks stored within the data storage cluster (704) the fingerprint and identifier will be removed from the global chunk data structure (705). Otherwise, return to 701 and wait for a delete chunk request. The global chunk data structure includes a reference count for each chunk stored in the cluster, i.e. number of references to each chunk.

Figure 8:
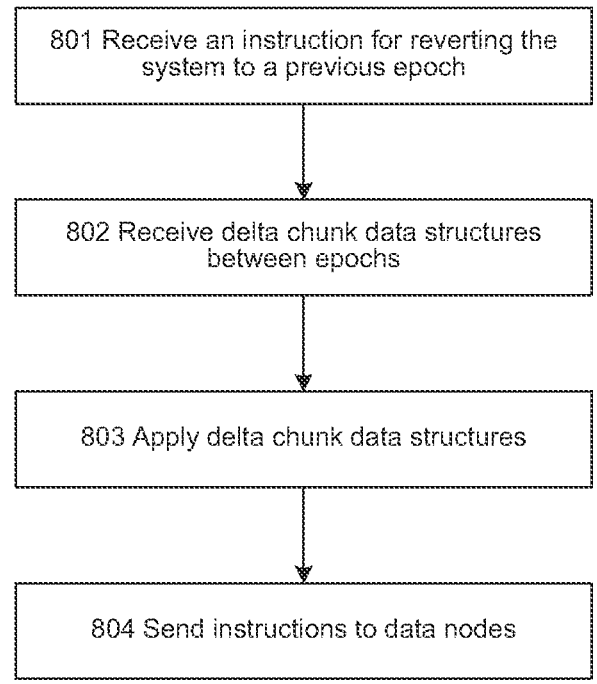
FIG. 8 illustrates an example of a process for reverting a data storage cluster from a current epoch to a previous epoch.

In some cases it may be desirable to roll back (revert) the data storage cluster from a current epoch to a previous epoch, an example of a process for which is illustrated in FIG. 8. In that case, in response to an appropriate instruction (e.g., from a storage administrator, 801), each of the metadata nodes in the cluster requests and receives the delta chunk data structures that are applicable between the previous epoch to the current epoch and that are not stored at that metadata node, from other metadata nodes within the data storage cluster (802). The delta chunk data structures can are applied at that metadata nodes to roll back the portion of the global chunk data structure maintained on that metadata node to the previous epoch (803). The metadata nodes further send instructions to their assigned data nodes to operate on the data chunks based on the delta chunk data structures (804). For example, the instructions can include an instruction for a data node to delete a data chunk that was added during the latest epoch. After deduplication, there should be only one copy of each data chunk stored in the data storage cluster.

The above-described technique of using an epoch-based, distributed global chunk data structure allows the system to periodically deduplicate data even in the face of node failures, storage device (e.g., disk) failures and network failures. Every epoch represents a globally consistent view where some number of duplicate chunks has been eliminated from the system. The technique scales to arbitrary numbers of data nodes in the system, enables deduplication across all data nodes, and handles node and disk failures.

In addition to the above disclosure, each data node can further contain a local cache created on the unused storage spaces in the data node, to improve read performance. Details of the technique of using the local cache are disclosed in the following paragraphs.

In a data storage cluster, multiple data nodes provide distributed storage for data chunks, as discussed above. For a data object containing more than one data chunk, the data chunks can reside on different data nodes in the cluster. Reading a data object can involve collecting the chunks of the data object from two or more data nodes in the cluster and reconstructing the data object at one of those nodes. Multiple network requests may be required to obtain all of the chunks, which can slow down the response time of the read request and negatively impact read performance.

For example, in a data storage cluster including nodes 1 and 2, node 1 can store the object record for object ID 999, which contains chunks A and B. (An object record is a metadata object that records at least the mapping of the data object to chunk IDs, e.g., it contains the chunk IDs that make up that data object.) However, chunk A may be stored on node 1, while chunk B is stored on node 2. Node 2 may have an object record for object ID 888, which also contains chunk B. After deduplication, actual chunks are unique within the cluster; thus, only one instance of chunk B exists in the cluster. To respond to a read request, node 1 is responsible for reconstructing that object. Node 1 needs to request and wait for chunk B from node 2. That operation involves a network hop and transferring a chunk over the interconnect network, which is undesirable.

To solve this problem, fast access to data chunks can be provided by caching any given chunk on the node that is responsible for storing the object record of that chunk. The chunks that will be cached are those that are permanently stored on other nodes. To continue the example discussed in the previous paragraph, in this case, node 1 will cache chunk B in a cache space of node 1, while node 2 permanently stores chunk B. To respond to a read request of object ID 999, node 1 retrieves chunk A from its permanent storage and chunk B from its cache space, without the need to contact node 2. The result is that a read request of that object can be completely satisfied by the node that is storing the object record because it is also storing all of the chunks for that object by virtue of the caching. In order to accomplish this, data nodes can use their unused space to cache the chunks. As storage space of a data node becomes full, the cached chunks that have permanent locations elsewhere in the cluster can be deleted.

The cache on a given data node can be populated in either of at least two ways: during handling a WRITE request or during handling a READ request. A WRITE request is a request from a client to store a data object in the data storage cluster. A READ request is a request from a client to read a data object from the data storage cluster. The cache can be populated while handling a WRITE request by having the data node that is responsible for storing the object record, of the data object that is the subject of the WRITE request, locally cache all chunks of that object that are permanently stored in other nodes after deduplication. For instance, a data node may receive a WRITE request for writing an entire data object from a client. The data node divides the object into multiple chunks and asks a metadata node where the chunks should be stored. Any chunks that the metadata node decides should be stored on other nodes will be locally cached in a local cache storage in the data node. The local cache storage resides in the unused storage space of the non-volatile storage in the data node.

Figure 9:
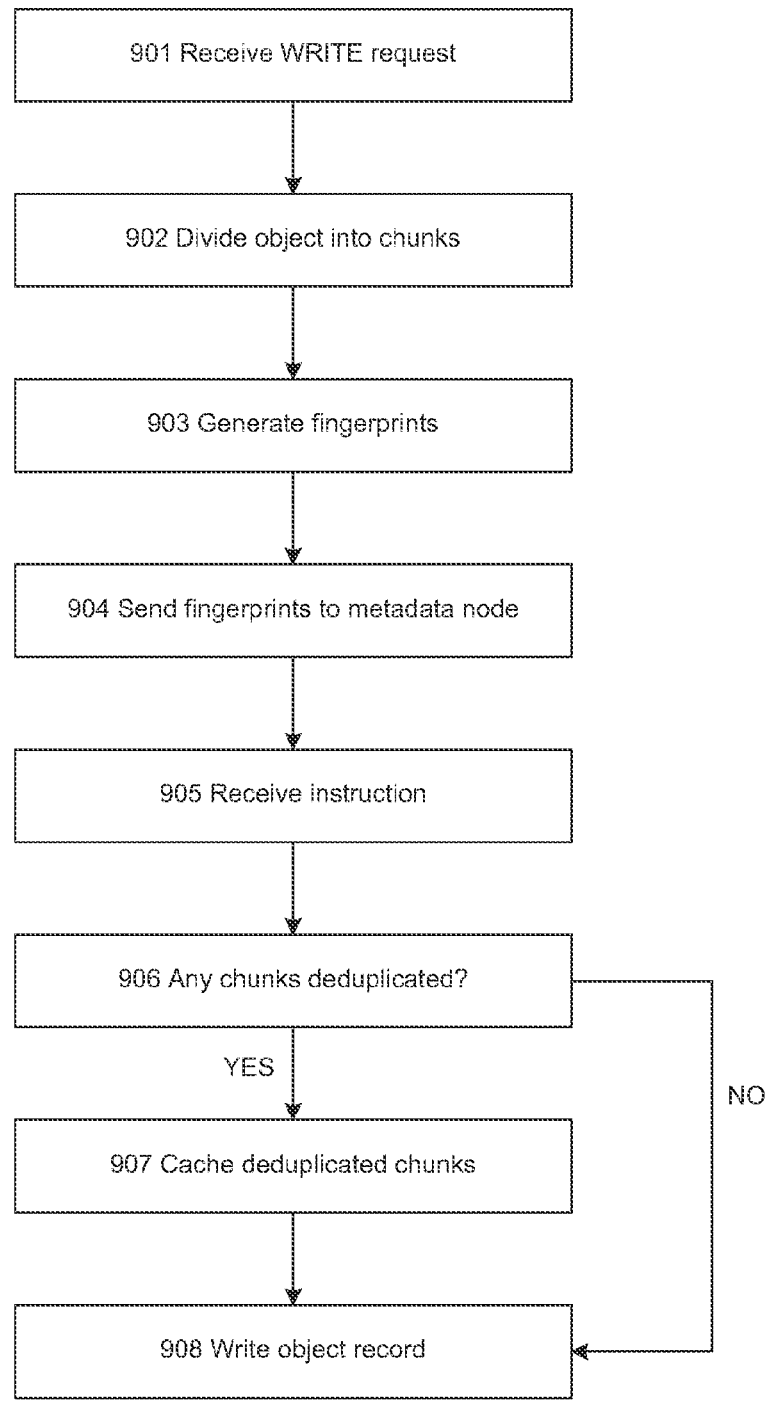
FIG. 9 illustrates an example of processing for handling a WRITE request using local cache.

FIG. 9 illustrates an example of processing for handling a WRITE request using local cache. A data node of a data storage cluster receives a WRITE request from a client for storing a data object identified by an object ID (901). The data node divides the object into multiple data chunks (902) if the size of the object guarantees the dividing and generates fingerprints for the chunks (903). The data node sends the fingerprints of the object to a metadata node of the data storage cluster (904). In one embodiment, the data node sends the fingerprints to a metadata node that is assigned to that data node. In another embodiment, after inquiring with the metadata nodes, the data node sends the fingerprints to the metadata node that has the least current workload among the metadata nodes. The data node then receives an instruction from the metadata node to which it sent the fingerprints (905). The instruction can be to deduplicate some or all of the chunks of the object and to store rest of the chunks locally; or the instruction can be to store all chunks of the object (deduplicating none of the chunks). If any of the chunks are deduplicated by the instruction from step 905 (906), the data node caches the deduplicated chunks in its local cache storage (907). The local cache storage is in unused storage space of a non-volatile storage of the data node. After the chunks are stored and/or cached in the data node, the data node writes an object record of the data object recording the chunks IDs for the object (908). If none of the chunks is deduplicated by the instruction from step 905, all chunks are permanently store in the data node and no chunks are needed to be cached. Accordingly the data node writes an object record of the data object recording the chunks IDs of the chunks that are stored in the node (908).

The cache can also be populated while handling a READ request for accessing a data object. If the data node that is rebuilding an object needs to retrieve chunks stored in other data nodes, that data node can then cache the retrieved non-local chunks in its local cache storage. In the future if the data node receives another READ request for the same data object, the data node does not need to gather again those non-local chunks from other nodes. Moreover, those chunks in the local cache storage can be used to satisfy requests for other data objects that also contain the cached data chunks.

Figure 10:
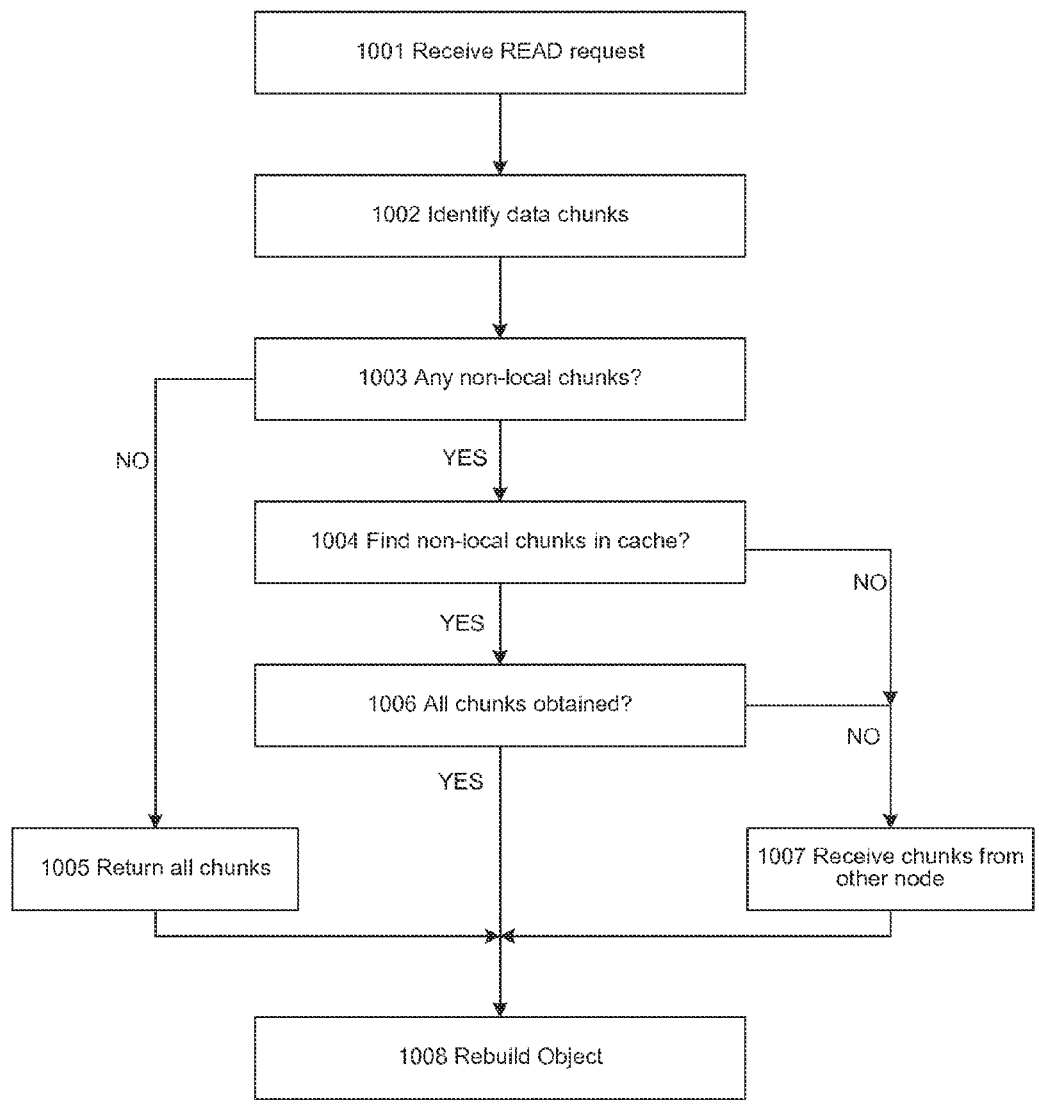
FIG. 10 illustrates an example of processing for handling a READ request using local cache.

FIG. 10 illustrates an example of a process for handling a READ request using local cache. A data node of a data storage cluster receives a READ request from a client for reading a data object identified by an object ID (1001). The READ request includes an object handle for the data object. The data node uses the object handle to locate the data object's object records, looks up the object ID in the object's object record and identifies the data chunks of the data object from the object record (1002). If the object record shows that some data chunks of the data object are permanently stored in other data nodes (1003), the data node accesses its local cache storage to try to gather the chunks that are not permanently stored locally (1004). If all data chunks are obtained from local cache storage (1006), the data node rebuilds the data object to satisfy the read request (1008). If not all data chunks are obtained from local cache storage, the data node contacts other data nodes to gather chunks remotely stored in other data nodes (1007). In one embodiment, the data node contacts all nodes for the needed chunks. In another embodiment, the data node first contacts a metadata node for the locations of chunks and then contacts the appropriate data nodes directly to obtain the chunks. If no deduplication has been performed for these data chunks (1003), the data node directly returns all chunks of the object that are available in the data node (1005). Once the data node has all data chunks of the data object, the node rebuilds the data object for the READ request (1008).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A method, comprising:
    storing a global chunk data structure for a data storage cluster in a distributed manner among two or more of a plurality of metadata nodes of the data storage cluster, the global chunk data structure containing data fingerprints, wherein the two or more metadata nodes respectively maintain at least a portion of the global chunk data structure;
    recording fingerprints of new data written to the data storage cluster into a plurality of delta chunk data structures, wherein each of the delta chunk data structures is stored in a different one of the plurality of metadata nodes;
    requesting, by a metadata node of the plurality of metadata nodes, permission to lead the plurality of metadata nodes in a metadata epoch transition;
    in response to receiving permission from every other metadata node of the plurality of metadata nodes, updating a version of the global chunk data structure corresponding to a particular epoch to a consistent state based on versions of the delta chunk data structures corresponding to the particular epoch; and
using the updated global chunk data structure to identify duplicate data in the data storage cluster.

2. The method of claim 1, further comprising:
in connection with updating the version of the global chunk data structure, updating an epoch indication for the global chunk data structure to a new value, wherein the epoch indication indicates the version of the global chunk data structure.

3. The method of claim 1, wherein the data storage cluster further includes a plurality of nodes.

4. The method of claim 3, further comprising:
receiving, at a data node of the plurality of data nodes, a request to write data;
dividing the data from the request into data chunks;
generating chunk fingerprints for the data chunks; and
sending the chunk fingerprints to a metadata node of the plurality of metadata nodes.

5. The method of claim 1, further comprising:
receiving, at a metadata node of the plurality of metadata nodes, portions of the global chunk data structure from other metadata nodes of the plurality of metadata nodes;
identifying duplicate data, including comparing the fingerprints of the new data with entries in the global chunk data structure; and
sending instructions for deduplicating the duplicate data to data nodes storing the duplicate data.

6. The method of claim 5, further comprising:
caching the duplicate data in unused storage spaces of the data nodes.

7. A method comprising:
receiving, at a metadata node of a plurality of metadata nodes within a data storage cluster, chunk fingerprints and identifiers of a plurality of data chunks, from a data node of a plurality of data nodes within the data storage cluster;
writing at least one pair of a chunk fingerprint and an identifier of a data chunk into a delta chunk data structure of the metadata node; and
requesting, by the metadata node, permission to lead the plurality of metadata nodes in a metadata epoch transition;
in response to receiving permission from every other metadata node of the plurality of metadata nodes, updating a global chunk data structure with the delta chunk data structure and updating an epoch indication for the global chunk data structure to a new value, wherein the epoch indication indicates a version of the global chunk data structure, and wherein the global chunk data structure is stored in a distributed manner, wherein a portion of the global chunk data structure is maintained at each metadata node.

8. The method of claim 7, further comprising:
identifying, at the metadata node, duplicate chunk fingerprints from the chunk fingerprints received at the metadata node, wherein each of the duplicate chunk fingerprints matches a fingerprint entry of the global chunk data structure.

9. The method of claim 8, wherein the writing of at least one pair of the chunk fingerprints and the identifiers into a delta chunk data structure of the metadata node comprises:
writing chunk fingerprints that are not duplicate chunk fingerprints and identifiers of the chunk fingerprints that are not duplicate chunk fingerprints into a delta chunk data structure of the metadata node.

10. The method of claim 7, wherein the updating of a global chunk data structure with the delta chunk data structure comprises:
adding fingerprints and identifiers stored in the delta chunk data structure into the portion of the global chunk data structure maintained at the metadata node.

11. The method of claim 7, further comprising:
receiving a delete chunk request including a fingerprint and an identifier of a data chunk; and
storing the fingerprint and the identifier of the delete chunk request into the delta chunk data structure.

12. The method of claim 7, wherein the updating of a global chunk data structure with the delta chunk data structure comprises:
removing a fingerprint and an identifier from the global chunk data structure, if the delta chunk data structure includes a delete chunk request including the fingerprint and the global chunk data structure shows that the fingerprint is no longer associated with any data chunks stored within the data storage cluster.

13. The method of claim 7, further comprising:
sending the new value to the other metadata nodes within the data storage cluster; and
updating an epoch indication at each of the other metadata nodes with the new value.

14. The method of claim 7, further comprising:
receiving, at the metadata node, portions of the global chunk data structure that are not stored locally in the metadata node, from the other metadata nodes within the data storage cluster.

15. The method of claim 7, further comprising:
updating a portion of the global chunk data structure maintained at a second metadata node within the data storage cluster with a delta chunk data structure stored in the second metadata node and updating an epoch indication at the second metadata node to a second new value.

16. The method of claim 15, wherein an order of updating portions of the global chunk data structure maintained at metadata nodes within the data storage cluster is determined by a way of round robin, diffused computation, or leadership election.

17. The method of claim 7, further comprising:
identifying an epoch indication of a revived metadata node that revives from off-line;
retrieving a current epoch indication from at least one metadata node within the data storage cluster;
receiving one or more delta chunk data structures that are applicable between a first epoch represented by the epoch indication of the revived node and a current epoch represented by the current epoch indication; and
applying each of the received delta chunk data structures to the revived metadata node so that the revived node has an epoch indication consistent with other metadata nodes within the data storage cluster.

18. The method of claim 7, further comprising:
receiving an instruction to roll back the data storage cluster from a current epoch to a previous epoch;
receiving, at each metadata node, delta chunk data structures that are applied between the previous epoch to the current epoch and that are not stored at said metadata node, from the other metadata nodes within the data storage cluster;
applying the delta chunk data structures, at each of the metadata nodes, to roll back the global chunk data structure to the previous epoch; and sending instructions to the data nodes to operate on data chunks stored in respective data nodes based on the delta chunk data structures.

19. The method of claim 7, further comprising:
receiving, at a data node of the plurality of data nodes within the data storage cluster, a request for adding a data object that includes a plurality of data chunks;
storing the data chunks at identifiers of the data node;
generating chunk fingerprints for the data chunks; and
sending chunk fingerprints and identifiers of the data chunks to the metadata node within the data storage cluster.

20. The method of claim 15, further comprising:
receiving, at a data node of the plurality of data nodes within the data storage cluster, a request to delete a data chunk;
locating an identifier of the data chunk at the data node;
generating a chunk fingerprint for the data chunk if the chunk fingerprint is not generated yet; and
sending a delete chunk request to the metadata node within the data storage cluster, wherein the delete chunk request includes the chunk fingerprint and the identifier for the data chunk.

21. The method of claim 20, further comprising:
sending an inquiry for an identifier of the data chunk to the metadata node, if the data chunk is not located in the data node;
receiving an answer for the identifier identifying a second data node within the data storage cluster; and
forwarding the delete chunk request to the second data node.

22. The method of claim 21, further comprising:
generating an answer for the identifier of the data chunk, at the metadata node, based on the global chunk data structure.

23. The method of claim 8, further comprising:
sending an instruction, from the metadata node, to a data node storing a data chunk having one of the duplicate fingerprints, to deduplicate the data chunk having one of the duplicate fingerprints at the data node.

24. The method of claim 7, wherein the global chunk data structure records fingerprints and identifiers of data chunks stored in the data nodes within the data storage cluster.

25. The method of claim 8, further comprising:
caching data chunks that have duplicate chunk fingerprints in an unused storage space of a data node within the data storage cluster.

26. A metadata node for use within a data storage cluster comprising a plurality of metadata nodes, the metadata node comprising:
a processor;
a network interface through which the metadata node can communicate with other nodes within the data storage cluster;
a non-volatile storage;
a memory storing instructions which, when executed by the processor, cause the metadata node to perform a process including:
receiving, at the metadata node, a chunk request associated with a data chunk, from a data node of a plurality of data nodes within the data storage cluster, wherein the chunk request includes a chunk fingerprint and an identifier of the data chunk, and wherein the chunk request further includes an operation flag;
writing the chunk request into a delta chunk data structure of the metadata node; and
requesting permission to lead the plurality of metadata nodes in a metadata epoch transition;
in response to receiving permission from every other metadata node of the plurality of metadata nodes, updating a global chunk data structure with the delta chunk data structure and updating an epoch indication for the global chunk data structure to a new value, wherein the epoch indication indicates a version of the global chunk data structure, and wherein the global chunk data structure is stored in a distributed manner, wherein at least a portion of the global chunk data structure is maintained at each metadata node.

27. The metadata node of claim 26, wherein the process further includes:
receiving an instruction to roll back the data storage cluster from a current epoch to a previous epoch;
receiving, at the metadata node, delta chunk data structures that are applied between the previous epoch to the current epoch and that are not stored at the metadata node, from the other metadata nodes within the data storage cluster;
applying the delta chunk data structures, at the metadata nodes, to roll back the global chunk data structure to the previous epoch; and
sending instructions to the data nodes to operate on data chunks stored in respective data nodes based on the delta chunk data structures.

28. A data node for use within the data storage cluster that includes the metadata node of claim 26, the data node comprising:
a processor;
a network interface through which the data node can communicate with other nodes within the data storage cluster;
a non-volatile storage;
a memory storing instructions which, when executed by the processor, cause the data node to perform a process including:
identifying an epoch indication of the data node, wherein the data node revives from off-line;
retrieving a current epoch indication from at least one metadata node within the data storage cluster;
receiving delta chunk data structures that are applicable between a first epoch represented by the epoch indication of the data node and a current epoch represented by the current epoch indication; and
conducting data chunk operations recorded in each of the received delta chunk data structures to the data node so that the data node has an epoch indication consistent with other nodes within the data storage cluster.

* * * * *